United States Patent
Wheeler et al.

(10) Patent No.: US 12,202,674 B2
(45) Date of Patent: Jan. 21, 2025

(54) PACKAGING SYSTEM INCLUDING A SHRINK WRAP DEVICE FOR WRAPPING CONTAINERS THAT INCLUDE ENVIRONMENTALLY SENSITIVE PHARMACEUTICALS

(71) Applicant: Express Scripts Strategic Development, Inc., St. Louis, MO (US)

(72) Inventors: Anne Wheeler, St. Charles, MO (US); Jason L. Cagle, Indianapolis, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 692 days.

(21) Appl. No.: 17/479,602

(22) Filed: Sep. 20, 2021

(65) Prior Publication Data

US 2023/0087658 A1   Mar. 23, 2023

(51) Int. Cl.
| | | |
|---|---|---|
| *F25D 3/08* | (2006.01) | |
| *B65B 53/02* | (2006.01) | |
| *B65B 57/04* | (2006.01) | |
| *B65B 59/00* | (2006.01) | |
| *B65G 1/137* | (2006.01) | |
| *B65G 43/08* | (2006.01) | |
| *B65G 47/64* | (2006.01) | |
| *G06Q 10/087* | (2023.01) | |

(52) U.S. Cl.
CPC ............ *B65G 1/1375* (2013.01); *B65B 53/02* (2013.01); *B65B 57/04* (2013.01); *B65B 59/00* (2013.01); *B65G 1/1376* (2013.01); *B65G 43/08* (2013.01); *B65G 47/64* (2013.01); *B65B 2220/16* (2013.01); *B65G 2203/0216* (2013.01); *G06Q 10/087* (2013.01)

(58) Field of Classification Search
CPC ...... F25D 3/08; F25D 2331/8014; A61J 1/165
See application file for complete search history.

(56) References Cited

U.S. PATENT DOCUMENTS

| | | | |
|---|---|---|---|
| 6,305,185 B1 * | 10/2001 | Sloan | A45C 15/00 62/235.1 |
| 6,871,184 B1 * | 3/2005 | Liberman | G07F 7/00 705/15 |
| 8,256,190 B2 | 9/2012 | Bowden | |
| 8,783,002 B2 | 7/2014 | Bowden | |
| (Continued) | | | |

FOREIGN PATENT DOCUMENTS

WO   WO-2022207574 A1 * 10/2022 ............... B65G 1/04

*Primary Examiner* — Eyamindae C Jallow
(74) *Attorney, Agent, or Firm* — Dickinson Wright PLLC

(57) ABSTRACT

A fulfillment system is provided and includes a perishable drug filling system and a non-perishable drug filling system. A shipping station is provided for delivering the coolers and the boxes to at least one delivery service. A conveyor is configured to move the boxes and the coolers from the drug filling systems to the shipping station. A decision station is located along the conveyor and is configured to determine if a container on the conveyor is a cooler or a box. The conveyor is configured to direct the coolers to a shrink wrap station and to direct the boxes to the shipping station while bypassing the shrink wrap station. The shrink wrap station is configured to apply a wrapper around the cooler and apply heat to the wrapper to shrink the wrapper around the cooler with the wrapper having a transparent section over a label on the cooler.

14 Claims, 10 Drawing Sheets

(56) References Cited

U.S. PATENT DOCUMENTS

| | | |
|---|---|---|
| 9,944,419 B2 | 4/2018 | Joplin |
| 10,053,248 B2 | 8/2018 | Joplin |
| 10,102,460 B2 | 10/2018 | Hoffman |
| 10,424,408 B2 | 9/2019 | Hoffman |
| 10,494,126 B2 | 12/2019 | Joplin |
| 10,745,162 B2 | 8/2020 | Joplin |
| 2002/0069674 A1 | 6/2002 | Guy |
| 2004/0243353 A1* | 12/2004 | Aghassipour ........ G06Q 10/047 702/187 |
| 2007/0028642 A1* | 2/2007 | Glade .................... A61B 90/98 62/457.2 |
| 2007/0193297 A1* | 8/2007 | Wilson ................... F25D 29/00 62/457.2 |
| 2012/0248101 A1* | 10/2012 | Tumber ................... F25D 3/08 53/473 |
| 2014/0138266 A1* | 5/2014 | McCormick ............ F28D 20/02 53/428 |
| 2019/0163876 A1 | 5/2019 | Remme |
| 2019/0359407 A1* | 11/2019 | Kale ................. B65D 5/46072 |
| 2022/0397912 A1* | 12/2022 | Franey ................ B65G 1/1373 |

\* cited by examiner

PACKAGING SYSTEM INCLUDING A SHRINK WRAP DEVICE FOR WRAPPING CONTAINERS THAT INCLUDE ENVIRONMENTALLY SENSITIVE PHARMACEUTICALS

BACKGROUND

High volume pharmacies process a range of different types of medications, including both perishable medications, which must be maintained within a predetermined temperature range, and non-perishable drugs. The perishable medications may be packaged in coolers along with cooling devices to maintain the medications within those predetermined temperature ranges, and the non-perishable drugs may be packaged in other types of containers, such as boxes, with less insulation than the coolers. While taping the boxes closed for shipping can often be accomplished quickly, it may be time consuming to effectively tape the coolers.

SUMMARY

According to an aspect of the present disclosure, a fulfillment system is provided. The fulfillment system includes a perishable drug filling system configured to fill prescription drugs of a first type into coolers for controlling the environments of the prescription drugs of the first type during shipment. The fulfillment system also includes a non-perishable drug filling system configured to fill prescription drugs of a second type into boxes for shipment. A shipping station is provided for delivering the coolers and the boxes to at least one delivery service. A conveyor is configured to move the boxes and the coolers from the drug filling systems to the shipping station. A decision station is located along the conveyor and is configured to determine if a container on the conveyor is a cooler or a box. In response to the decision station determining that the container on the conveyor is a cooler, the conveyor is configured to direct the container to a shrink wrap station. In response to the decision station determining that the container on the conveyor is a box, the conveyor is configured to direct the container towards the shipping station while bypassing the shrink wrap station. The shrink wrap station is configured to apply a wrapper around the cooler and apply heat to the wrapper to shrink the wrapper to a tight fit around the cooler with the wrapper having a transparent section over a label on the cooler.

In an embodiment, the conveyor includes a first track and a second track, and the shrink wrap station is located along the second track.

In an embodiment, a third track extends from the second track back to the first track. The decision station is located on the second track. In response to the decision station determining that the container is a cooler, the conveyor is configured to convey the cooler to the shrink wrap station, and in response to the decision station determining that the container is a box, the conveyor is configured to guide the box onto the third track to bypass the shrink wrap station.

In an embodiment, the decision station is located on the first track. In response to the decision station determining the container is a cooler, the conveyor is configured to guide the cooler onto the second track, and in response to the decision station determining the container is a box, the conveyor is configured to maintain the box on the first track to bypass the shrink wrap station.

In an embodiment, the decision station includes a scanner that can scan the label on the container to determine if the container is a cooler or is a box or other container.

In an embodiment, the shrink wrap station includes a wrapping portion that is configured to place the cooler into a bag or a tube of wrapping material. The shrink wrap station can includes a heat source or an oven portion that is configured to heat the cooler and the bag to shrink the bag or tube of wrapping material around the cooler.

In an embodiment, the oven portion includes an inlet and an outlet. At least one heating element is located adjacent the inlet, and an area adjacent the outlet is free of heating elements.

Another aspect of the present disclosure is related to a shrink wrap station. The shrink wrap station includes decision station with a scanner to read a machine readable code on a label of a container to determine if the container is a cooler or a box. The decision station is configured to direct coolers towards a shrink wrap device and to direct boxes around the shrink wrap device. The shrink wrap device includes a wrapping machine and an oven. The wrapping machine is configured to wrap the cooler in a wrapper. The oven is configured to apply heat to the wrapper and the cooler to shrink the wrapper around the container. The cooler is configured to insulate a medication contained in the cooler from the heat of the oven.

In an embodiment, a conveyor is provided. The conveyor includes a first track and a second track, and the shrink wrap device is located along the second track.

In an embodiment, the conveyor further includes a third track that extends from the second track back to the first track. The decision station is located on the second track. In response to the decision station determining that the container is a cooler, the conveyor is configured to convey the cooler to the shrink wrap station, and in response to the decision station determining that the container is a box, the conveyor is configured to guide the box onto the third track to bypass the shrink wrap device.

In an embodiment, the decision station is located on the first track. In response to the decision station determining the container is a cooler, the conveyor is configured to guide the cooler onto the second track, and in response to the decision station determining the container is a box, the conveyor is configured to maintain the box on the first track to bypass the shrink wrap device.

In an embodiment, the decision station includes a scanner that can scan the label on the container to determine if the container is a cooler or is a box.

In an embodiment, the oven includes an inlet and an outlet, at least one heating element is located adjacent the inlet, and an area adjacent the outlet is free of heating elements.

Yet another aspect of the present disclosure is related to a method of operating a fulfillment center. The method includes the step of filling a plurality of coolers with perishable drugs. The method proceeds with the step of filling a plurality of boxes with non-perishable drugs. The method continues with the step of guiding the coolers and boxes along a conveyor towards a decision station. The method proceeds with the step of reading labels on the coolers and boxes with a scanner at the decision station. In response to the decision station determining that a container is a cooler, the method continues with the steps of guiding the cooler along the conveyor towards a shrink-wrapping station, wrapping the cooler with a wrapper, and heating the wrapper to secure the wrapper to the cooler or to shrink the wrapper around the cooler. In response to the decision station determining that a container is a box, the method continues with the step of guiding the box with the conveyor along a path that bypasses the shrink-wrapping station.

In an embodiment, the method further includes the step of taping the boxes with the non-perishable drugs.

In an embodiment, the coolers with the perishable drugs are not taped prior to wrapping.

In an embodiment, the method further includes the step of applying the labels to the coolers and the boxes.

In an embodiment, the wrapper is transparent so that the labels on the coolers are visible through the wrapper.

In an embodiment, the method further includes the step of reading labels on the coolers and boxes with the scanner includes reading machine readable codes with the scanner.

In an embodiment, the method further includes the step of guiding the coolers and boxes into respective shipping containers.

The above embodiments can be joined together in any combination.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DESCRIPTION OF THE ENABLING EMBODIMENT

Referring to the Figures, wherein like numerals indicate corresponding parts throughout the several views, one aspect of the present disclosure is related to a fulfillment system that has a packaging and shipping system for packaging and shipping prescription drugs that are both environmentally sensitive (i.e., perishable) and non-environmentally sensitive (i.e., non-perishable).

Figure 1:
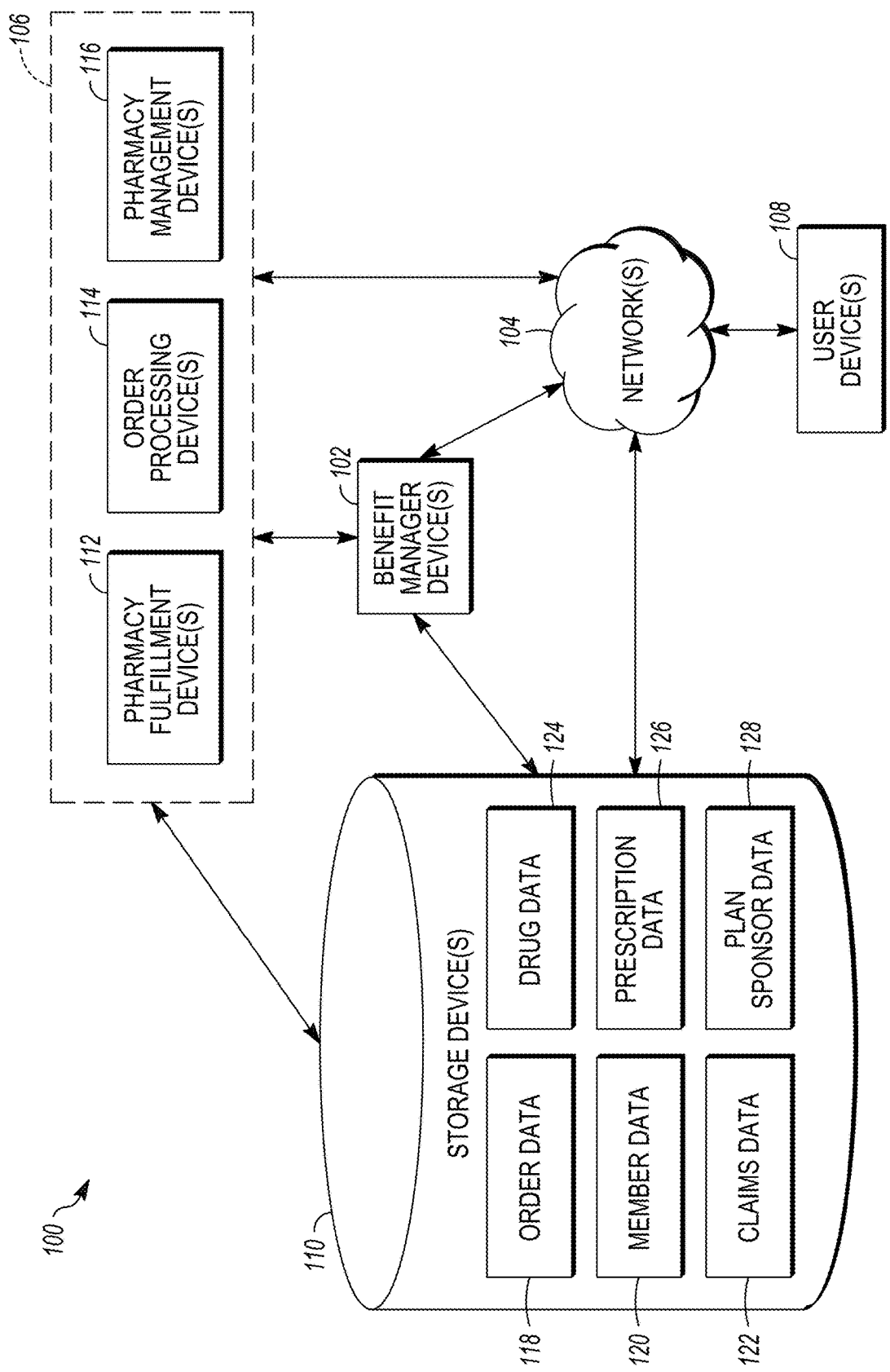
FIG. 1 is a block diagram of an example system according to an example embodiment.

FIG. 1 is a block diagram of an example pharmaceutical fulfillment system 100 that could be deployed in a high-volume pharmacy or fulfillment center (e.g., a mail order pharmacy, a direct delivery pharmacy, an automated pharmacy, a multiple package delivering center, and the like). A high-volume pharmacy may be a pharmacy that is capable of filling prescriptions automatically, mechanically, manually, or a combination thereof. The system 100 and/or the components thereof may otherwise be deployed in a lower volume pharmacy.

The system 100 may include a benefit manager device 102, a pharmacy device 106, and a user device 108, which may communicate either directly and/or over a network 104. The system may also include a storage device 110.

The benefit manager device 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefit including a medical or health benefit; a dental benefit; a vision benefit; a radiology benefit; a pet care benefit; an insurance benefit; a long-term care benefit; a nursing home benefit; and the like. The PBM may, in addition to its PBM operations, operate one or more than one pharmacy.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery, from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, prepared by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim, no copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the operations mentioned herein.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, 3rd Generation Partnership Project (3GPP) network, an Internet Protocol (IP) network, a Wireless Application Protocol (WAP) network, a Wi-Fi network, or an IEEE 802.11 standards network, as well as various combinations thereof. The network 104 may include an optical communication network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Virginia.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100 or may otherwise be used. The pharmacy fulfillment device 112 may include an item dispenser that includes a door as described herein. The door may include devices to stage groups of items, e.g., medication, small solids, or the like, for dispensing into an appropriate container. The containers can be tracked in the pharmacy fulfillment device 112 and/or the order processing device 114. The door may include apertures, openings or slots through which power lines can extend from inside the door to outside the door to allow movement of the door and maintenance of the door without completely disconnecting all bundled lines in the door.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device 114, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems or may be a multi-use device that has functionality outside off analysis of the methods and systems. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. The user device 108 running an application becomes a dedicated device when executing the application.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order. The prescription materials can also include a temperature sensing card that will be packaged within the container, e.g., a box, carton or cooler, which with contain a temperature sensitive item, e.g., a prescription drug.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
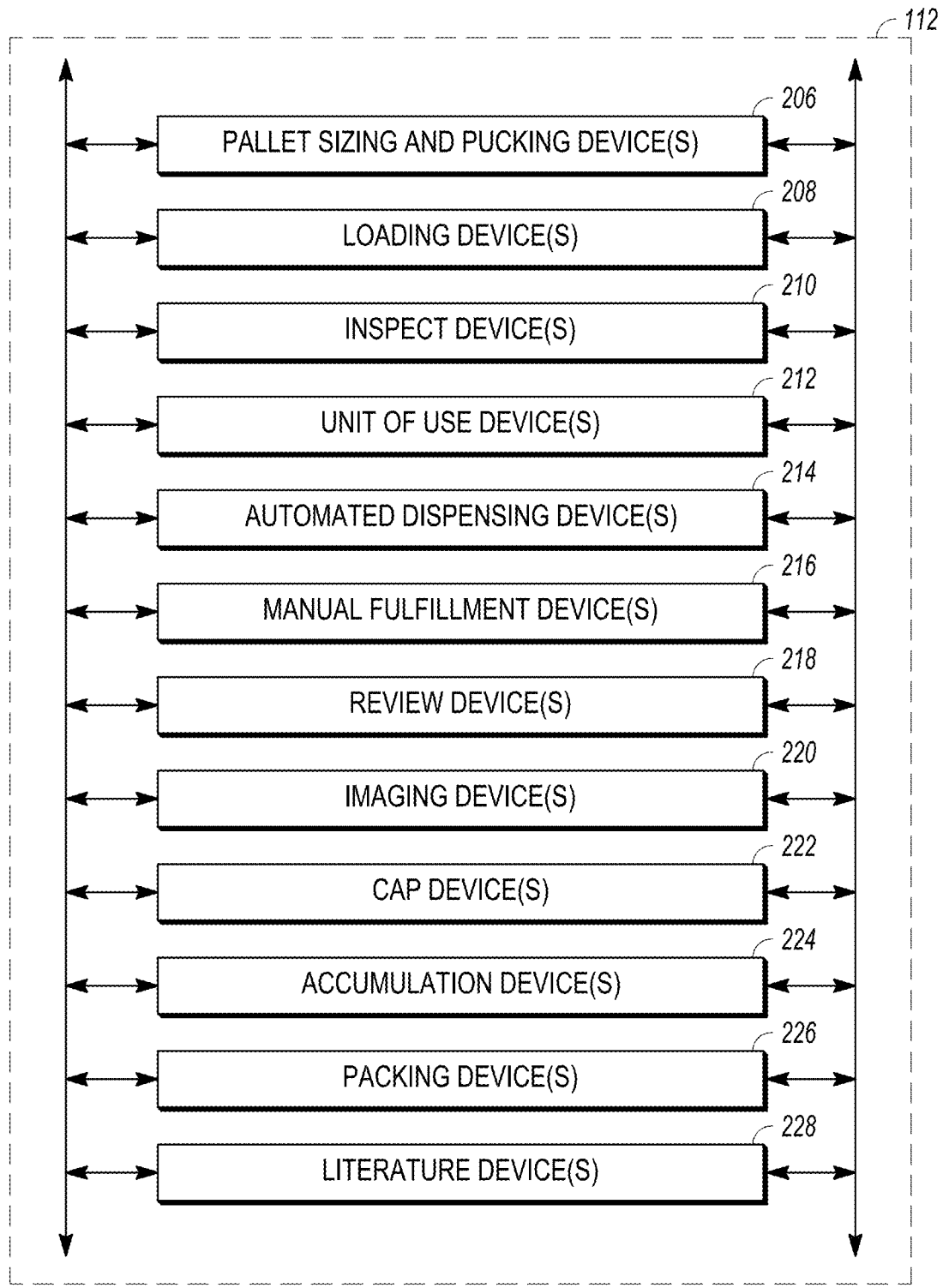
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 214, review device(s) 218, imaging device(s) 220, cap device(s) 222, accumulation device(s) 224, packing device(s) 226, and literature device(s) 228. Further, the pharmacy fulfillment device 112 may include additional devices, which may communicate with each other directly or over the network 104.

In some embodiments, operations performed by one or more of these devices 206-228 may be performed sequentially, or in parallel with the operations of devices as may be coordinated by the order processing device 114. In some embodiments, the order processing device 114 tracks a prescription with the pharmacy based on operations performed by one or more than one of the devices 206-228.

In some embodiments, the pharmacy fulfillment device 112 may transport prescription drug containers, for example, between one or more than one of the devices 206-228 in a high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping or may be shipped in combination with other prescription drugs dispensed by other devices (e.g., in the high-volume fulfillment center).

At least some of the operations of the devices 206-228 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping or may be shipped in combination with other prescription drugs dispensed by other devices in the high volume fulfillment center. The automated dispensing device 214 may include a counter to count medications from a hopper and dispense to a specified container through a dispensing door structure to stage and to guide the drug items to the specified container.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high-volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order.

The packing device 226, which is discussed in further detail below, packages prescription orders in preparation for shipping the order.

The pharmacy fulfillment device 112 in FIG. 2 may include single devices 206-228 or multiple devices 206-228 (e.g., depending upon implementation in a pharmacy). The devices 206-228 may be the same type or model of device or may be different device types or models. When multiple devices are present, the multiple devices may be of the same device type or models or may be a different device type or model. The types of devices 206-228 shown in FIG. 2 are example devices. In other configurations of the system 100, lesser, additional, or different types of devices may be included.

Moreover, multiple devices may share processing and/or memory resources. The devices 206-228 may be located in the same area or in different locations. For example, the devices 206-228 may be located in a building or a set of adjoining buildings. The devices 206-228 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Figure 3:
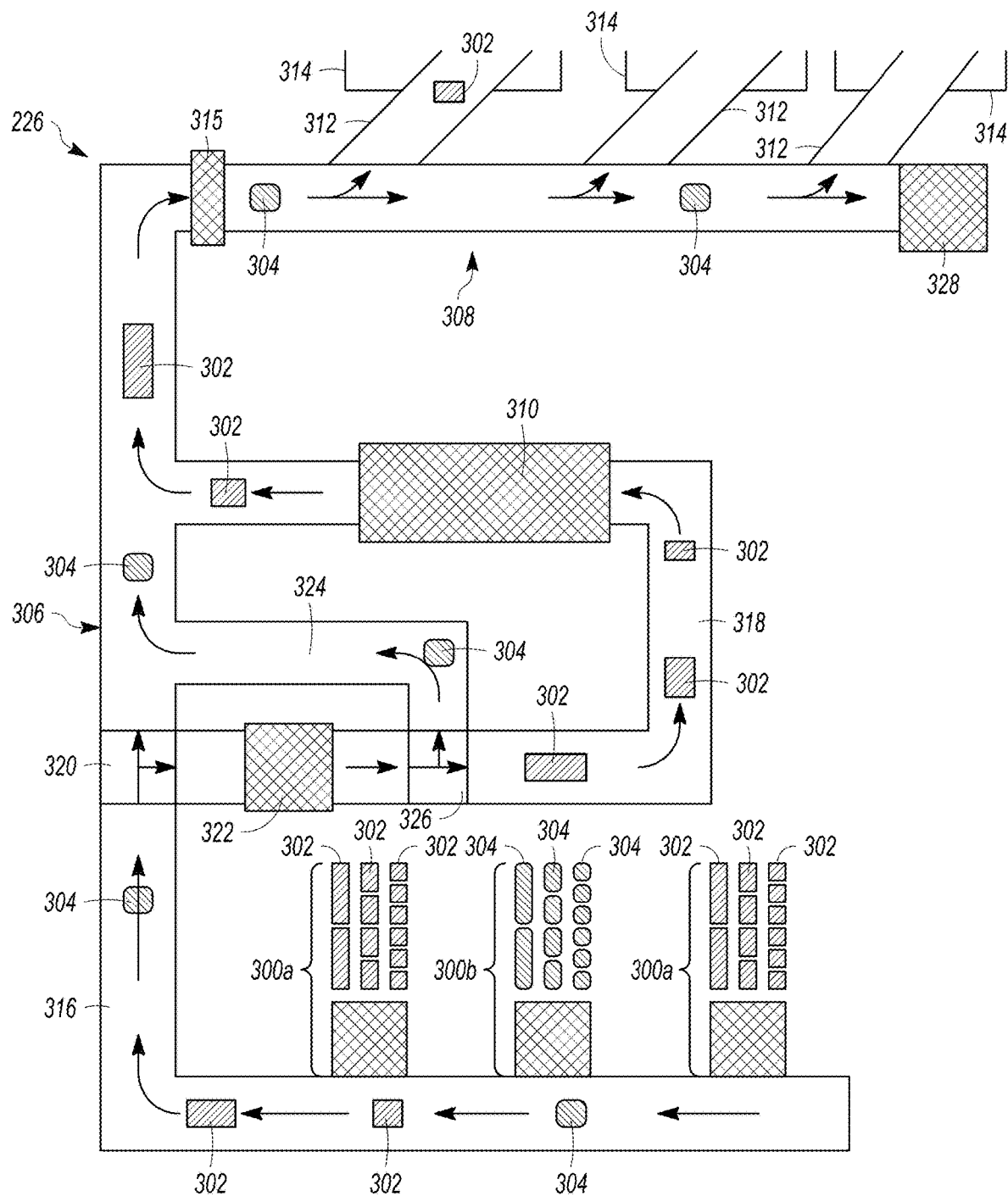
FIG. 3 is a schematic view illustrating a first exemplary embodiment of a packaging device.

With reference to FIG. 3, the packing device 226 of the fulfillment system includes a filling area that has a plurality of filling stations 300a, 300b (sometimes also known as picking and packing stations). In an exemplary embodiment, the filling stations 300a, 300b include at least one perishable drug filling station 300a that is dedicated to packaging prescription drugs of a first type (i.e., environmentally sensitive prescription drugs that must be maintained at low temperatures until use) into coolers 302 and at least one non-perishable filling station 300b that is dedicated to packaging prescription drugs of a second type (i.e., non-environmentally sensitive prescription drugs) into non-cooler packages, e.g., boxes 304. In the embodiment of FIG. 3, the filling area includes two perishable drug filling stations 300a and one non-perishable drug filling station 300b. However, any suitable number of each type of filling station 300a, 300b may be employed. In some embodiments, the filling stations can be configured to fill both environmentally sensitive prescription drugs into coolers and non-environmentally sensitive drugs into boxes. That is, in such embodiments, there are no dedicated perishable drug filling stations and non-perishable drug filling stations but rather just a plurality of filling stations that can either package perishable prescription drugs into coolers and non-perishable prescription drugs into boxes.

Many perishable drugs require temperature control and cannot be used if its temperature falls outside of a given exclusion time period, which is the time a drug can be outside its environmental control and remain a useable drug. The exclusion time period can be a function of the time outside the environmental control and the temperatures it encounters while outside the environmental control. Additionally, some drugs must be protected from direct sunlight during storage and transport. An example drug that requires environmental control is ENBREL®, which is stored between 36° F. and 46° F. (2° C. and 8° C.), which is the standard temperature for many home refrigerators. However, ENBREL® can be kept at room temperature (between 68° F. and 77° F. or 20° C. and 25° C.) for up to fourteen days. Another example perishable drugs that can require set temperature ranges is HUMIRA®.

The filling stations 300a, 300b can be fully manual, semi-automated, or fully automated. That is, in some embodiments, a person is located at one or more filling stations 300a, 300b to place the appropriate prescription drugs and any accompanying inserts (discussed in further detail below) into the cooler 302 or box 304. In other embodiments, the person may be assisted in the process of filling a cooler 302 or box 304 with at least one robot, e.g., a robotic arm. In still other embodiments, the insertion of the components into the cooler 302 or box 304 can be entirely automatically controlled by one or more robots or other mechanisms.

The perishable drug filling stations 300a may include different sizes of coolers 302 for packaging different shapes and sizes of perishable prescription drugs and any appropriate inserts to be included with the drugs. Some of the inserts located at the perishable drug filling stations are cooling devices, such as ice or dry ice packs, that can be placed in the coolers along with the prescription drugs to maintain the prescription drugs at appropriate temperatures during shipping. The coolers 302 may be made of a Styrofoam material or any suitable insulating material for insulating the perishable prescription drug within the cooler 302 from the environment.

The non-perishable drug filling stations 300b may include different sizes and/or types of boxes 304 (or other non-cooler type containers) for accommodating different sizes and shapes of non-perishable prescription drugs and their accompanying inserts. After filling, the boxes 304 may be taped or otherwise closed at the non-perishable drug filling stations 300b. In some embodiments, the boxes 304 may be made of a corrugated cardboard material. In other embodiments, the non-cooler containers could be pouches or bags.

At the filling stations 300a, 300b, a label, which may include a barcode, a quick response (QR) code, or the like, onto an outer surface of the cooler or box. In some embodiments, the label may be printed directly onto the cooler 302 or the box 304. In some embodiments, a radio frequency identification (RFID) chip may be placed in or on the cooler or the box in addition to or in lieu of the label.

Figure 4A:
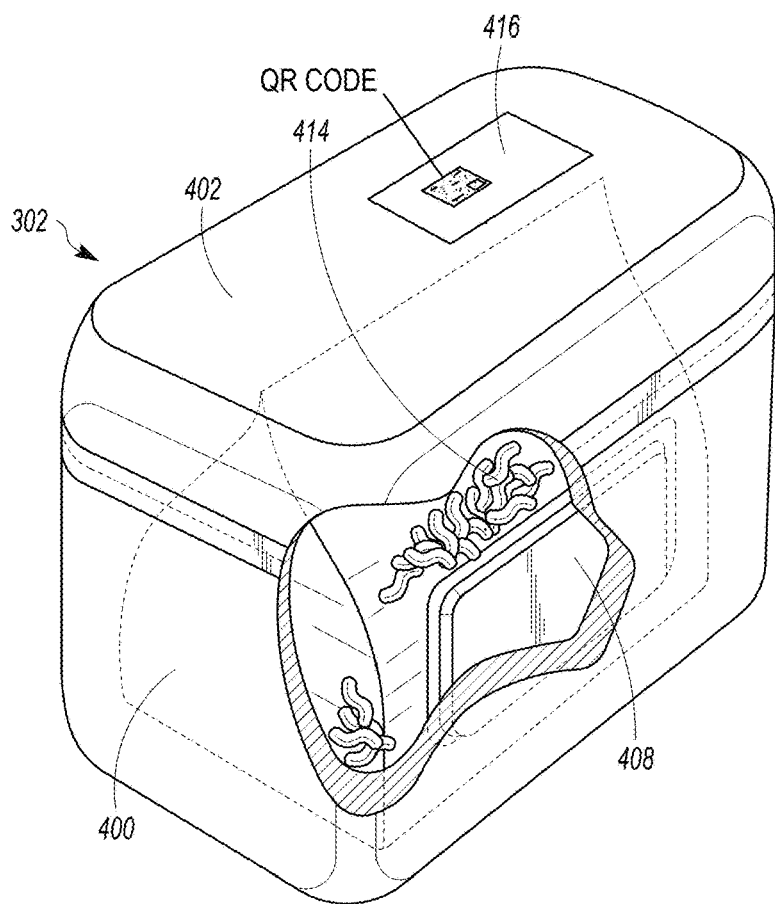
FIG. 4A is an exemplary embodiment of a including a prescription drug and a cooling device.
Figure 4B:
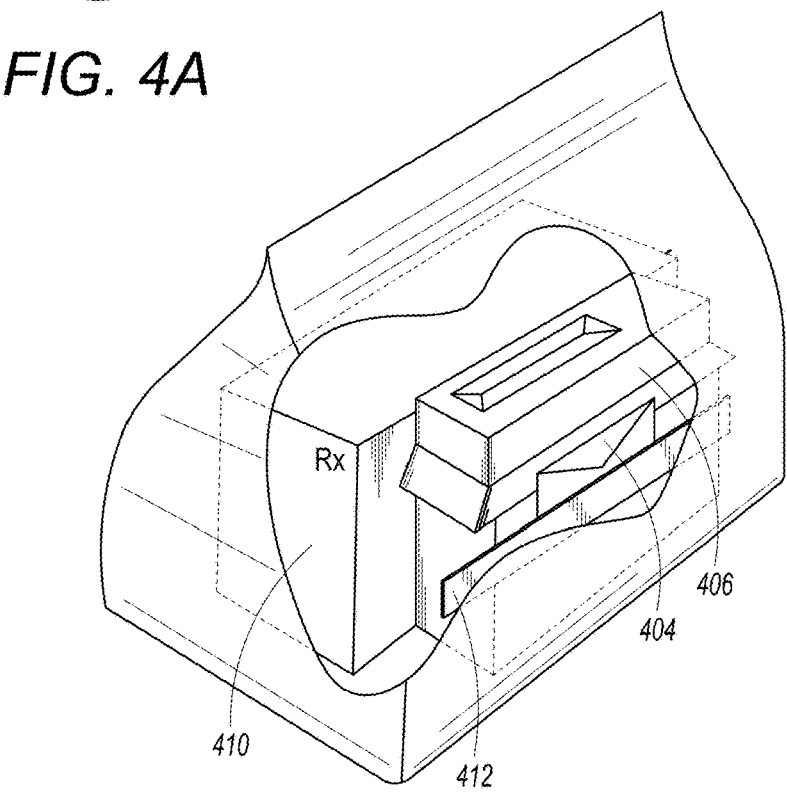
FIG. 4B is a package contained within the cooler of FIG. 4A and including a perishable drug and inserts.

Referring now to FIG. 4, an exemplary embodiment of a cooler that has been packaged at a perishable drug filling station is shown. The cooler 302 includes both a container 400 and a lid 402 that are snugly fit together, i.e., through a frictional engagement. In this embodiment, the accompanying inserts include, literature or other prescription information papers 404 from the literature device 228 (shown in FIG. 2); a sharps container 406, a cooling device 408 to keep the perishable prescription drugs 410 in the cooler 302 at the appropriate temperature, a temperature sensor 412, and a filling material 414, e.g., air bags, bubble wrap, packing peanuts, or the like. The cooler 302 further includes the label 416 including a QR code applied to its outer surface. At the perishable drug filling stations, the lid 402 is not taped onto or otherwise secured with the container 400 beyond the snug fit. The lid 402 is further secured with the container 400 occurs when a transparent wrapper or film is applied to the cooler 302 at a shrink-wrapping device as discussed in further detail below.

The cooling device 408 can be an ice pack, a gel pack, or any suitable means for controlling temperature within the cooler 302. Many different types and quantities of cooling devices 408 can be located in the perishable drug filling station, and type and quantity that is chosen for each individual cooler 302 may be selected based on a range of different factors. Some such factors include the type of perishable prescription drug 410 in the cooler 302, the location of the intended destination of the cooler 302, and the estimated time it will take for the cooler 302 to reach its intended destination plus a safety factor.

In some embodiments, the envelope 404 containing the papers, the perishable prescription drug 410, the sharps container 406, and the temperature sensor 412 may all be pre-inserted into a sub-container, such as a bag 418, prior to these components reaching the perishable drug filling station. The bag 418 may then be inserted as a pre-assembled unit into the cooler 302 at the perishable drug filling station.

The specific size of the cooler 302 as well as its contents, such as what inserts are included, may vary from cooler 302 to cooler 302 in the packing device. In other words, the perishable drug filling stations are configured to rapidly package customized orders according to customers' unique orders and locations and to protect the contents, including various types of perishable prescription drugs, throughout the shipping process.

In an example embodiments, the filling station 304a, 300b can include the elements of the devices and structures described in U.S. patent application Ser. No. 17/062,266, which is hereby incorporated by reference in its entirety.

Referring back to FIG. 3, the filling stations 300a, 300b are located adjacent a conveyor 306, which extends from the filling area to a shipping area 308. The conveyor 306 may include one or more driven belts and/or rollers that can be selectively actuated by a controller (shown schematically in FIG. 5) to guide the filled coolers 302 along one defined path, which includes a shrink-wrapping device 310, to the shipping area 308 and to guide non-coolers (e.g., the boxes 304) through a different path, which bypasses the shrink-wrapping device 310, to the shipping area 308.

In the exemplary embodiment, the shipping area includes a plurality of separate ramps 312 that lead to respective shipping gaylords 314 for collecting filled coolers 302 and boxes 304. The controller automatically activates the conveyor 306, such as by actuating re-directing devices, to guide the coolers 302 and boxes 304 on the conveyor 306 onto the appropriate ramp 312 and into the appropriate shipping gaylord 314 for shipment to their final destinations. The respective gaylords 314 may be associated with, for example, different shipping locations or different delivery services. From the shipping area 308, the coolers 302 and boxes 304 may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

A shipping scanner 315 is disposed at an entrance to the shipping area 308 and, in operation, scans a label on each package to determine which of the shipping gaylords 314 the package should be deposited within. The conveyor 306 then automatically guides the package onto the appropriate ramp 312 and into the appropriate gaylord 314 based on this scan. The shipping scanner 315 may be an optical sensor, such as a bar code reader or a quick response (QR) code reader or it may be a different type of sensor, such as a radio frequency identification (RFID) sensor.

The conveyor 306 has a first track 316 that extends directly from the filling area to the shipping area 308. A second track 318 intersects with the first track 316 between the filling area and the shipping area 308. A first junction 320 at the intersection between the first and second tracks 316, 318 is configured to either allow coolers 302 and boxes 304 to stay on the first track 316 or to enter the second track 318. The controller controls the operation of the first junction 320. In some embodiments, the first junction 320 includes a push arm with an actuator to control movement of coolers 302 and boxes 304 through the first junction 320.

A decision station in the form of a scanner 322 is positioned on the second track 318 and is configured to identify the type of container (cooler 302 or box 304) on the conveyor 306 to determine if it is a cooler 302 to be shrink-wrapped or a box 304, which does not require shrink-wrapping. In some embodiments, the scanner 322 may include one or more optical scanning devices that can read the label on the cooler 302 or the box 304. Such an optical scanning device may be, for example, a bar code reader or a QR code reader. The scanner 322 reads the data from the label and references a database (shown schematically in FIG. 5) to determine if the container is either a cooler 302 or a box 304. In some embodiments, the scanner 322 may be a camera that captures an image of the container and compares the image to the database to determine if the container is a cooler 302 or a box 304. Machine learning may be employed to improve the reliability of the image processing and comparison process to improve the accuracy of the cooler 302 or box 304 determination. In still other embodiments, the scanner 322 may be a sensor that can read a signal from a chip, such as a radio frequency identification (RFID) chip, disposed on or within the container. The results of the read are referenced in the database to determine if the container is a cooler 302 or a box 304.

In some embodiments, the scanner 322 includes a scale that measures a weight of a cooler 302 or box 304 at the scanner 322. The measured weight may be compared against an expected weight (also known as a calculated weight) in a database to ensure that the cooler 302 or box 304 contains the correct medications and inserts associated with its label. If the weight of the cooler 302 or box 304 is not within a predetermined range of the expected weight, then at the scanner 322, a new label is applied to the cooler 302 or box 304 and it is routed to an exceptions area 328 adjacent the shipping area 308.

A third track 324 extends from the second track 318 back to the first track 316 while bypassing the shrink-wrapping device 310. The conveyor 306 includes a second junction 326, which is located downstream of the scanner 322 but upstream of the shrink-wrapping device 310. The second junction 326 is configured to divert the boxes 304 from the second track 318 onto the third track 324. Specifically, if the scanner 322 determines that a container on the second track 318 is a box 304 including a non-perishable prescription drug, then the second junction 326 is activated to divert the box 304 from the second track 318 to the third track 324. The third track 324 brings the box 304 back to the first track 316, which carries the box 304 to the shipping area 308.

If the scanner 322 is unable to determine whether a container on the second track 318 is a cooler 302 or a box 304, then the container is diverted from the second track 318 to the third track 324 and is guided along the first track 316 past the shipping area 308 to an exceptions area 328, where the container can be analyzed to determine what caused the error at the scanner 322. In some embodiments, the exceptions area can be located at a different location than in the exceptions area 328, such as adjacent or along the third track 324.

If the scanner 322 determines that the container on the second track 318 is a cooler 302 that needs to be shrink-wrapped, then the cooler 302 is guided past the third track 324 towards the shrink-wrapping device 310. As discussed in further detail below, the shrink-wrapping device 310 applies a transparent film over the entire outer surface of the cooler to hold the lid on the cooler 302 during shipping, i.e., the film encapsulates the cooler 302. The transparency of the film allows the label, which is located on the outer surface of the cooler 302, to be visible and able to be read even after the shrink-wrapping is completed. The shrink-wrapping not only holds the lid on the cooler 302 but also prevents the label from falling off of the cooler 302 during transit. Further, the transparent film functions as a tamper-proof feature in that its removal or any damage done to it may be evidence to a user that the cooler 302 may have been tampered with.

In some embodiments, the packing system 226 may include multiple types of non-coolers including a first type of non-cooler that does not require shrink-wrapping and a second type of non-cooler that is to be shrink-wrapped. In such cases, the scanner 322 can distinguish between the two types of non-coolers and diverts the ones that do not require shrink-wrapping onto the third track 324 to bypass the shrink-wrapping device 310 while allowing the non-coolers that do require shrink-wrapping to continue on the second track 318 to the shrink-wrapping device 310.

If the scanner 322, the second track 318, the shrink-wrapping device 310, and/or the third track 324 is malfunctioning, then the first junction 326 can be operated in a bypass mode to keep all containers (both coolers 302 and boxes 304) on the first track 316. In the bypass mode, coolers 302 can be taped or otherwise secured prior to being deposited into the appropriate one of the gaylords 314.

Figure 5:
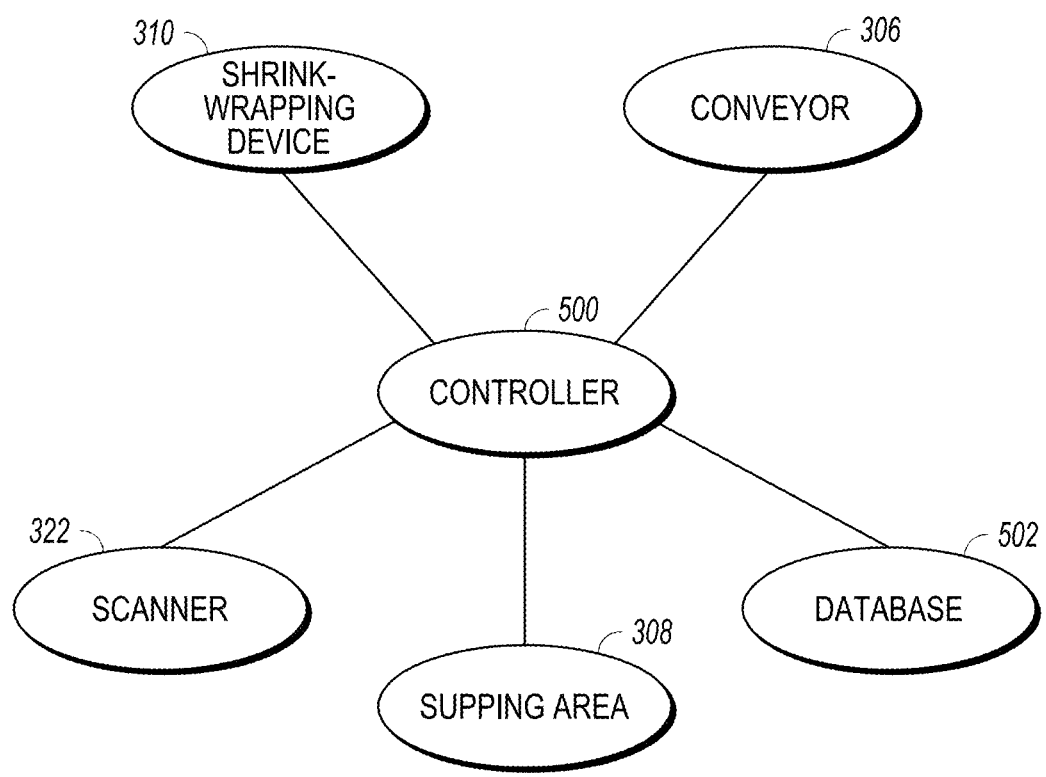
FIG. 5 is a block view illustrating the electrical components of the packaging device of FIG. 3.

Referring now to FIG. 5, the electrical components of the packing device are shown schematically. The packing device includes a controller 500 that can be internal to the packing device or can be located remotely therefrom. The controller 500 is in electrical communication with the conveyor 306 for controlling the movement of the coolers and boxes along the conveyor towards the shipping area 308. Specifically, the controller 500 is configured both to selectively activate and de-activate rollers and/or belts on the first, second, and third tracks and also to appropriately activate the first and second junctions to direct the coolers towards the shrink-wrapping device 310 and to direct the boxes onto the third track so the boxes bypass the shrink-wrapping device 310. The controller 500 is also in electrical communication with the scanner 322 and the database 502. In operation, the controller 500 instructs the scanner 322 to scan the package (such as to scan a label or a wireless chip). Data is transmitted from the scanner 322 to the controller 500, and the controller 500 automatically makes a determination of whether the package that was scanned is a cooler or a box. The controller 500 is also in electrical communication with the shipping area 308 to automatically guide the coolers and boxes onto the appropriate ramps and into the appropriate shipping gaylords. In another example, the controller 500 communicates with an external server to determine if the package is a cooler to be wrapped or a box that does not need to be wrapped.

Figure 6:
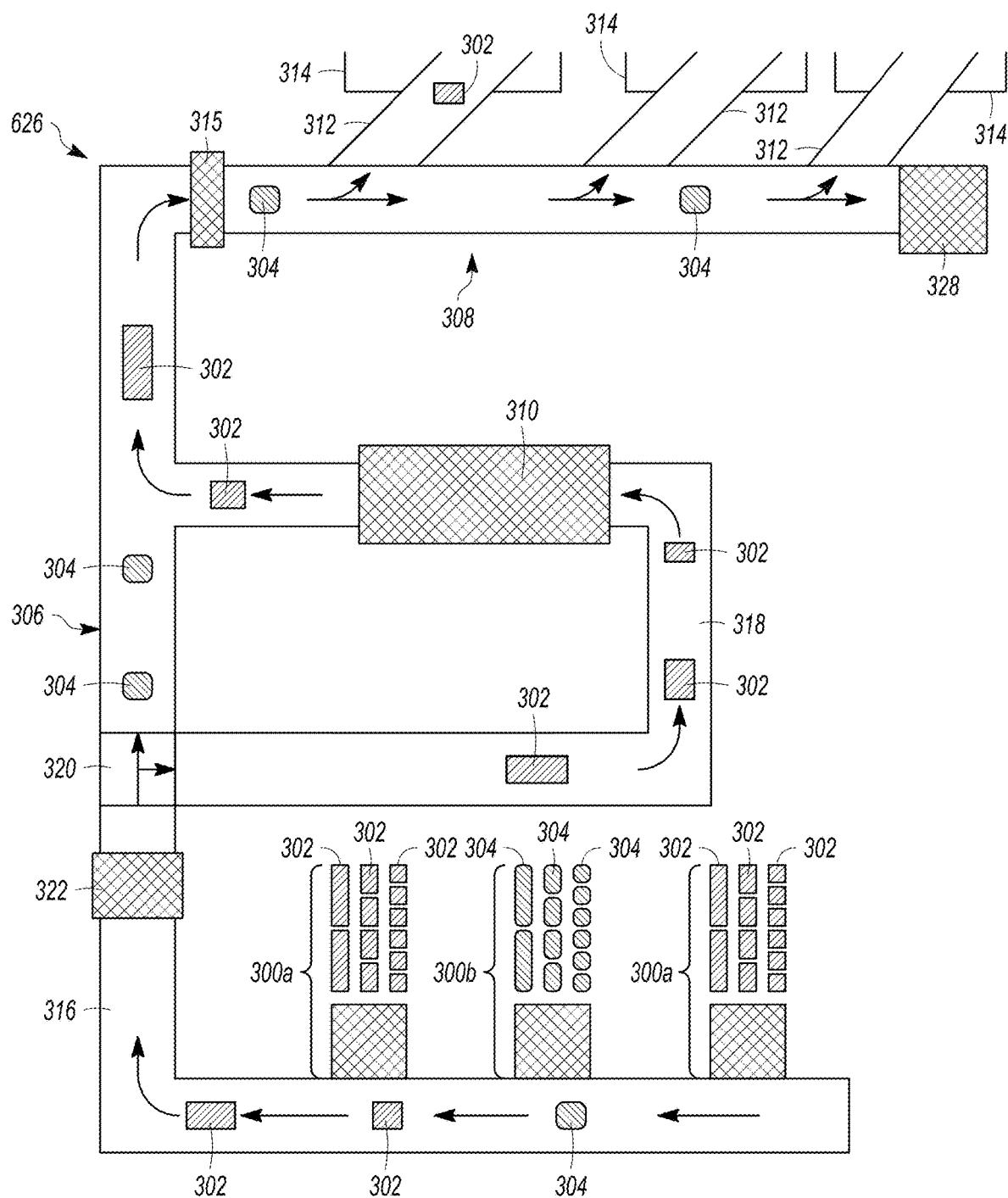
FIG. 6 is a schematic view illustrating a second exemplary embodiment of the packaging device.

Referring now to FIG. 6, an alternate embodiment of the packing device 626 is shown. In the alternate embodiment, the scanner 322 is located on the first track upstream of the first junction 320, and there is no third track. In operation, the coolers 302 are redirected by the first junction 320 onto the second track 318 and to the shrink-wrapping device 310, and the boxes 304 bypass the second track 318 and continue along the first track 316 to the shipping area 308.

Figure 7:
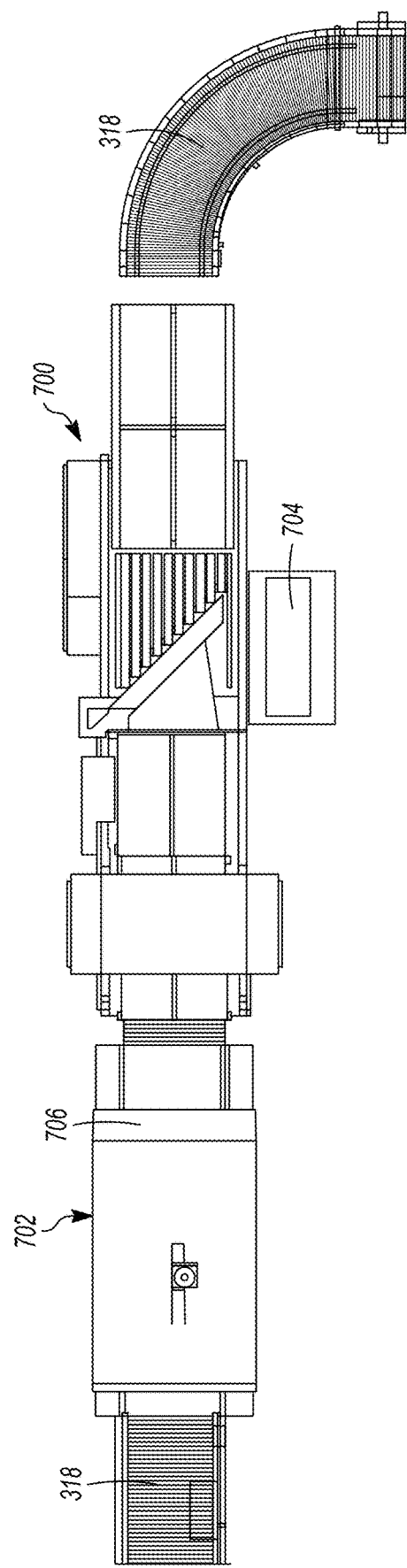
FIG. 7 is an enlarged view of a heat-shrinking device of the packaging device.

Referring now to FIG. 7, an exemplary embodiment of the shrink-wrapping device 310 is generally shown. The shrink-wrapping device 310 has a total length of greater than twenty-five feet. In one example, the shrink-wrapping device has a total length of twenty-six feet. The shrink-wrapping device 310 includes a wrapping portion 700 and an oven portion 702. In operation, the wrapping portion 700 receives the unwrapped coolers 302 from the second track 318 and wraps the film 704 around the cooler 302 to envelop the cooler 302, and the oven portion 702 heats the film to shrink the film tightly around the cooler 302.

Figure 8:
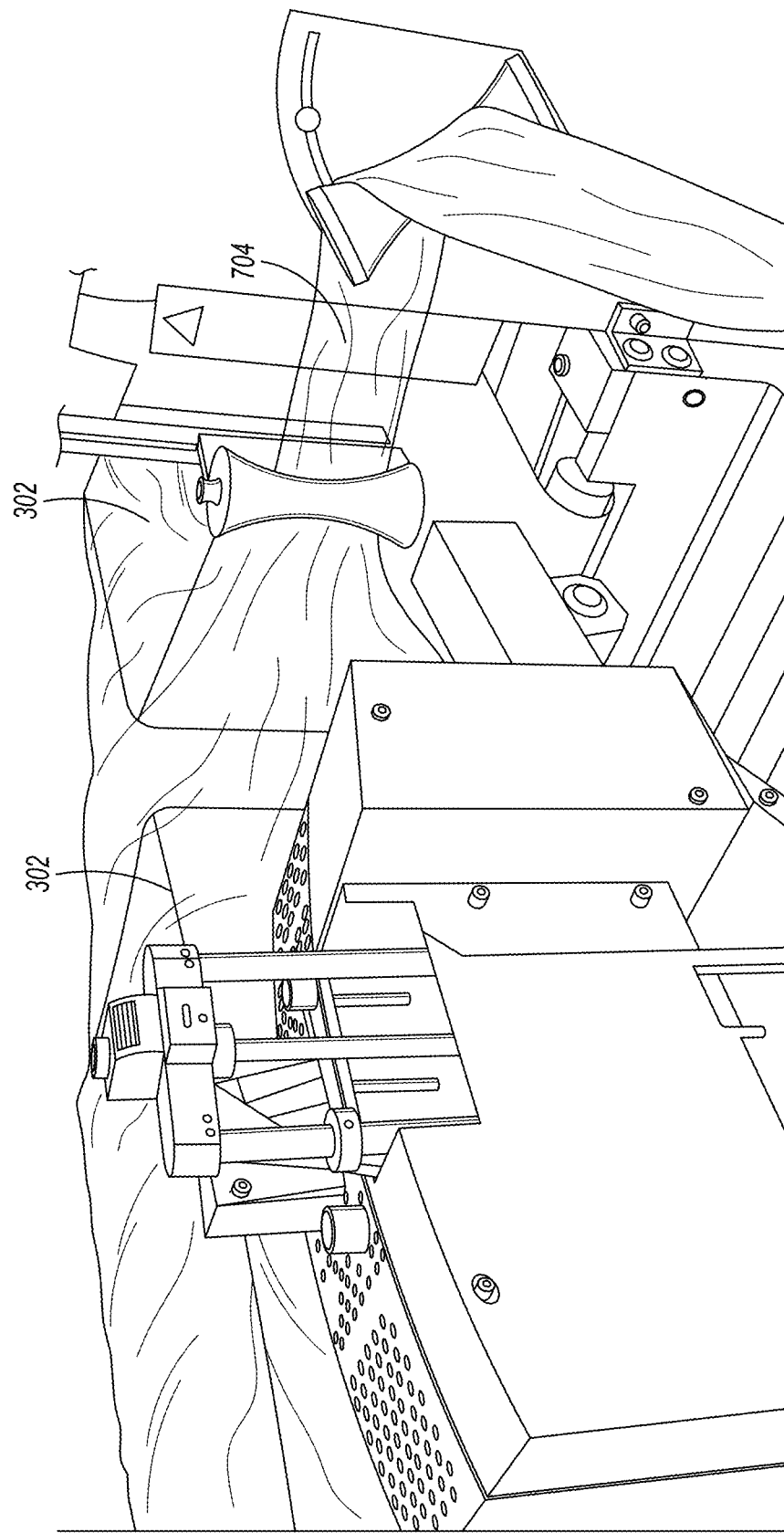
FIG. 8 is a perspective view illustrating a cooler during a wrapping operation.

When a cooler 302 is received into the wrapping portion 700 of the shrink-wrapping device 310, a series of belts guide it into a proper position sufficiently spaced from any preceding coolers 302 in the shrink-wrapping device 310. In some embodiments, the gap between coolers 302 is approximately three inches. The cooler 302 is then fed into a continuous sleeve of transparent (clear) film 704, as shown in FIG. 8. In some embodiments, air is blown into the sleeve of film 704 to hold the sleeve open and assist with inserting the coolers 302 into the sleeve.

Figure 9:
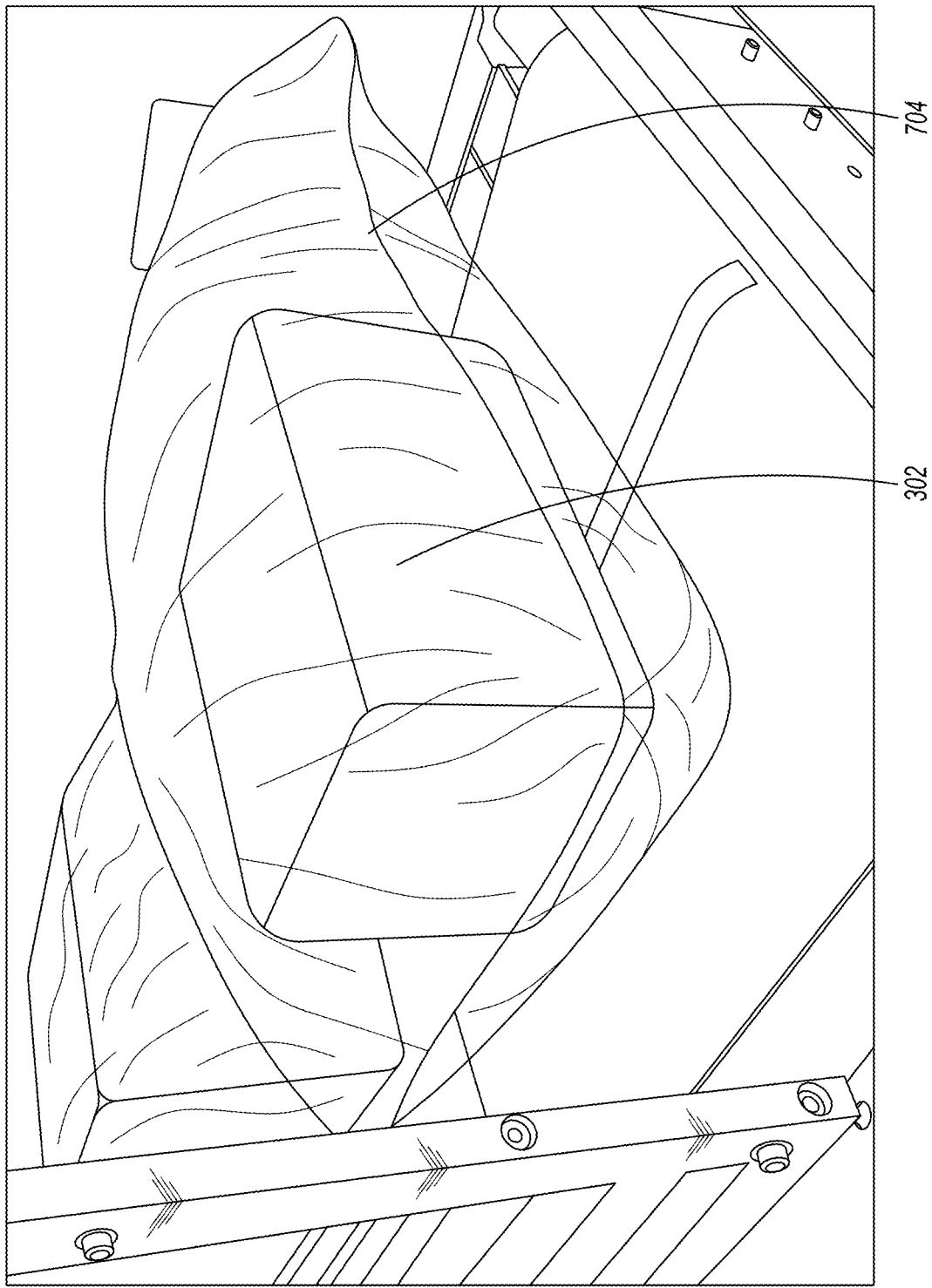
FIG. 9 is a perspective view illustrating a cooler following a wrapping operation and prior to a heat-shrinking operation.

One or more hot knives clamp down the sleeve of film 704 between two adjacent coolers 302 to both create a seam and cut the sleeve such that both adjacent coolers 302 are now within their own respective bags of film 704. FIG. 9 shows a cooler 302 within a bag of film 704 after the cutting is completed. As shown, at this stage, the bag is inflated around the cooler 302. Referring back to FIG. 7, the coolers 302 are then fed into the oven portion 702.

The oven portion 702 includes a heater that maintains the cooler 302 and the film 704 at an elevated temperature as the cooler 302 is guided through the oven portion 702 and back onto the second track 318. A curtain closes off an outlet of the oven portion 702 to trap heat within the oven portion 702 but also allow the coolers 302 to exit the oven portion 702 after sufficient shrinking of the film is completed. The heater 706 is located adjacent an inlet of the oven portion 702, and the area of the oven portion 702 adjacent the outlet is free of heating elements. The heater 706 may be powered through any suitable heating means, e.g., electric, propane, natural gas, etc.

The cooler 302 with the film 704 around it is moved continuously through the oven portion 702 to shrink the film 704 around the cooler 302 without damaging the film 704. The film 704 includes a plurality of perforations to allow air between the film 704 and the cooler 302 to escape from this area, thereby shrinking the film 704 around the cooler 302.

Figure 10:
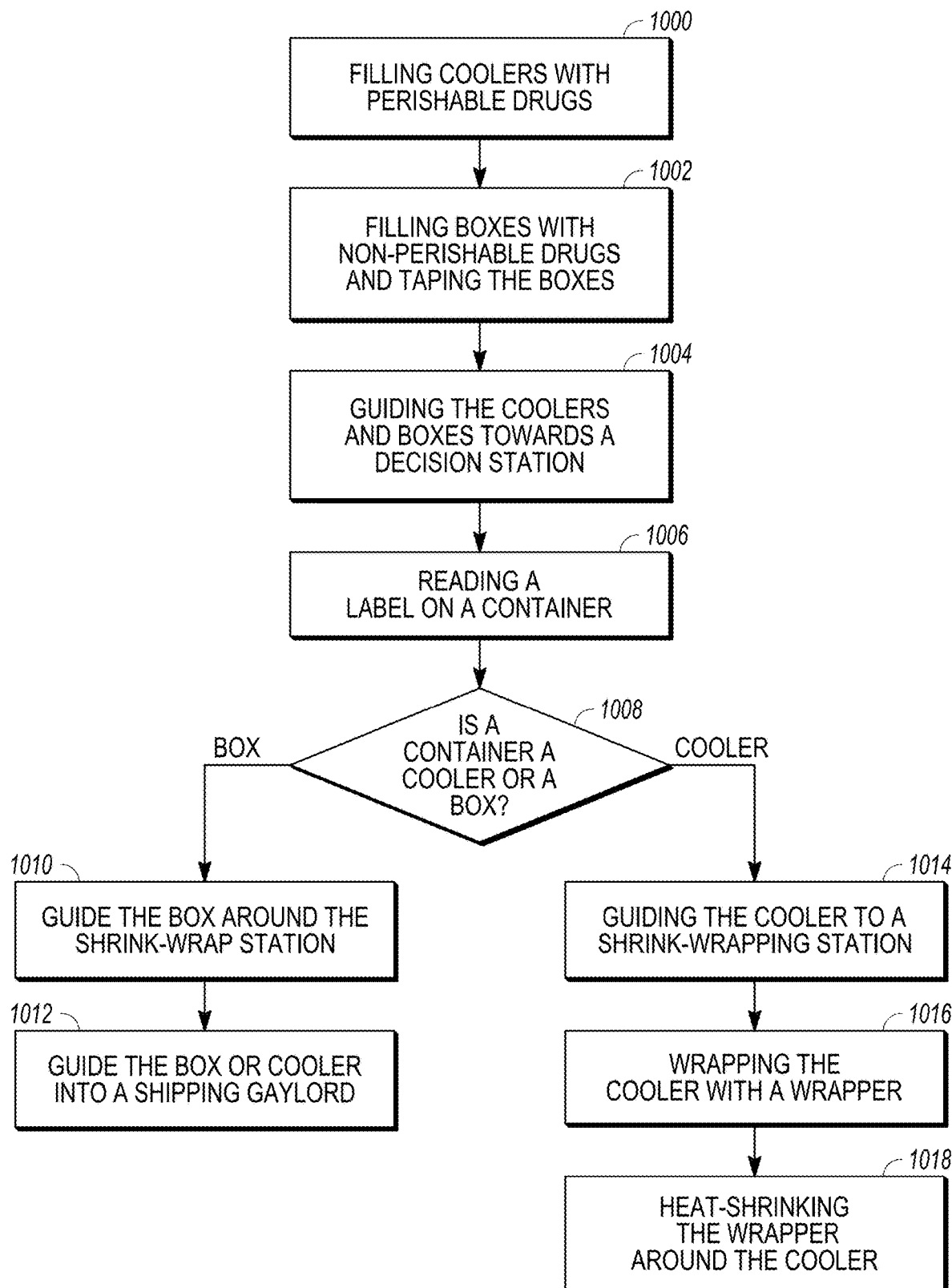
FIG. 10 is a flow chart illustrating the steps of an exemplary packaging method.

Referring now to FIGS. 3 and 10, a flow chart depicting an exemplary method of operating a packing device 226 is shown. At step 1000, the method includes the step of filling the coolers 302 with perishable drugs at a perishable drug filling station 300a. At step 1002, the method proceeds with filling boxes 304 with non-perishable drugs and taping the boxes 304 at a non-perishable drug filling station 300b.

At step 1004, the coolers 302 and boxes 304 are guided along a conveyor 306 towards a decision station including the scanner 322 and the first junction 320. At step 1006, the label on the container is read by the scanner 322.

At decision step 1008, the decision station determines if the container that was scanned by the scanner 322 is a cooler 302 or a box 304. If the answer at decision step 1008 is that the container is a box 304, then at step 1010, the conveyor 306 guides the box 304 around the shrink-wrapping device 310 and towards the shipping area 308.

At step 1012, the conveyor 306 guides the box 304 into an appropriate shipping gaylord 314 for shipping to a customer.

If the answer at decision step 1008 is that the container is a cooler 302, then at step 1014, the cooler 302 is guided to the shrink-wrapping device 310. At step 1016, the cooler 302 is wrapped with the wrapper or film. At step 1016, the cooler or film is heat-shrinked tightly around the cooler 302. The method then proceeds to step 1012, and the conveyor 306 guides the cooler 302 into an appropriate shipping gaylord 314 for shipping to a customer.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A fulfillment system, comprising:
    a perishable drug filling system configured to fill prescription drugs of a first type into coolers for controlling the environments of the prescription drugs of the first type during shipment;
    a non-perishable drug filling system configured to fill prescription drugs of a second type into boxes for shipment;
    a shipping station for delivering the coolers and the boxes to at least one delivery service;
    a conveyor configured to move the boxes and the coolers from the drug filling systems to the shipping station;
    a decision station located along the conveyor and configured to determine if a container on the conveyor is a cooler or a box;
        in response to the decision station determining that the container on the conveyor is a cooler, the conveyor being configured to direct the container to a shrink wrap station,
        in response to the decision station determining that the container on the conveyor is a box, the conveyor being configured to direct the container towards the shipping station while bypassing the shrink wrap station; and
    the shrink wrap station being configured to apply a wrapper around the cooler and apply heat to the wrapper to shrink the wrapper to a tight fit around the cooler with the wrapper having a transparent section over a label on the cooler.

2. The fulfillment system as set forth in claim 1 wherein the conveyor includes a first track and a second track, the shrink wrap station being located along the second track.

3. The fulfillment system as set forth in claim 2 further including a third track that extends from the second track back to the first track;
   wherein the decision station is located on the second track;
   in response to the decision station determining that the container is a cooler, the conveyor being configured to convey the cooler to the shrink wrap station; and
   in response to the decision station determining that the container is a box, the conveyor being configured to guide the box onto the third track to bypass the shrink wrap station.

4. The fulfillment system as set forth in claim 2 wherein the decision station is located on the first track;
   in response to the decision station determining the container is a cooler, the conveyor being configured to guide the cooler onto the second track; and
   in response to the decision station determining the container is a box, the conveyor being configured to maintain the box on the first track to bypass the shrink wrap station.

5. The fulfillment system as set forth in claim 1 wherein the decision station includes a scanner that can scan the label on the container to determine if the container is a cooler or is a box.

6. The fulfillment system as set forth in claim 1 wherein the shrink wrap station includes a wrapping portion that is configured to place the cooler into a bag and includes an oven portion that is configured to heat the cooler and the bag to shrink the bag around the cooler.

7. The fulfillment system as set forth in claim 6 wherein the oven portion includes an inlet and an outlet, at least one heating element being located adjacent the inlet, and an area adjacent the outlet being free of heating elements.

8. A method of operating a fulfillment center, comprising the steps of:
   filling a plurality of coolers with perishable drugs;
   filling a plurality of boxes with non-perishable drugs;
   guiding the coolers and boxes along a conveyor towards a decision station;
   reading labels on the coolers and boxes with a scanner at the decision station;
   in response to the decision station determining that a container is a cooler:
      guiding the cooler along the conveyor towards a shrink-wrapping station,
      wrapping the cooler with a wrapper, and
      heating the wrapper to shrink the wrapper around the cooler; and
   in response to the decision station determining that a container is a box, guiding the box with the conveyor along a path that bypasses the shrink-wrapping station.

9. The method as set forth in claim 8 further including the step of taping the boxes with the non-perishable drugs.

10. The method as set forth in claim 8 wherein the coolers with the perishable drugs are not taped prior to wrapping.

11. The method as set forth in claim 8 further including the step of applying the labels to the coolers and the boxes.

12. The method as set forth in claim 11 wherein the wrapper is transparent so that the labels on the coolers are visible through the wrapper.

13. The method as set forth in claim 8 wherein the step of reading labels on the coolers and boxes with the scanner includes reading machine readable codes with the scanner.

14. The method as set forth in claim 8 further including the step of guiding the coolers and boxes into respective shipping containers.

\* \* \* \* \*